Patented Feb. 24, 1925.

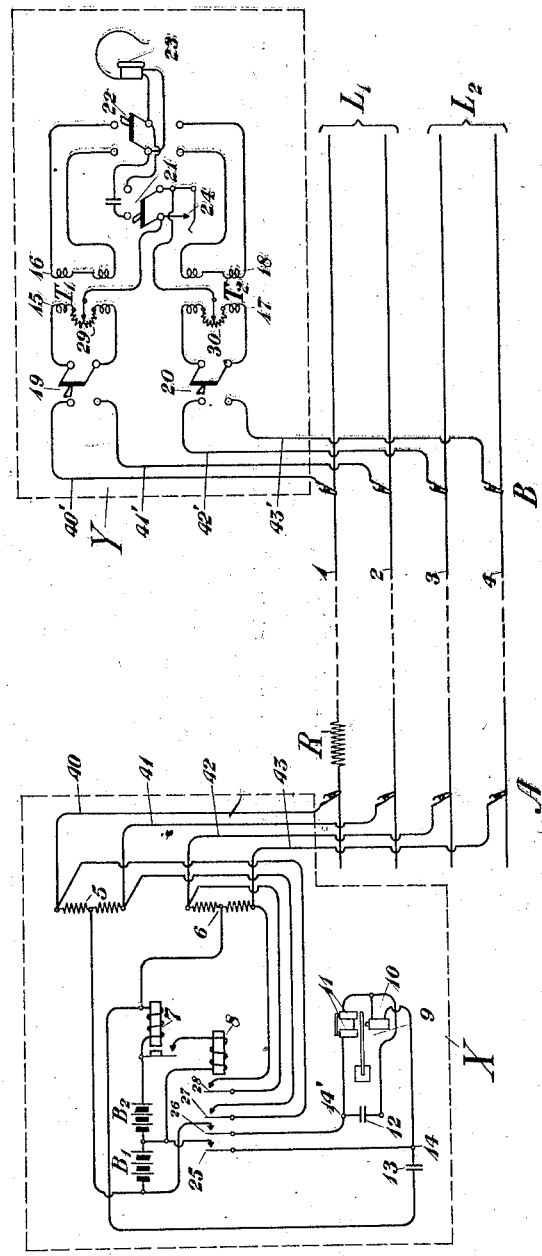

1,527,345

UNITED STATES PATENT OFFICE.

BENJAMIN H. BIRCHALL, OF HIGHLAND PARK, PENNSYLVANIA, ASSIGNOR TO AMERICAN TELEPHONE AND TELEGRAPH COMPANY, A CORPORATION OF NEW YORK.

ELECTRICAL TESTING DEVICE.

Application filed June 1, 1921. Serial No. 474,119.

*To all whom it may concern:*

Be it known that I, BENJAMIN H. BIRCHALL, a citizen of the United States, residing at Highland Park, in the county of Delaware and State of Pennsylvania, have invented certain Improvements in Electrical Testing Devices, of which the following is a specification.

This invention relates to electrical testing devices and particularly to means for determining the existence and location of electrical unbalances in signaling circuits.

For the proper operation of signaling circuits, and particularly of phantom telephone circuits, it is necessary that the sides of the circuit shall be well balanced electrically, that is to say, the resistance, inductance, and capacity of the sides of a circuit shall be substantially the same. An electrical unbalance reduces the transmission efficiency of the circuit by causing cross-talk and increasing the susceptibility of the circuit to interference from electric power circuits, consequently it is desirable to locate and remove as promptly as possible, all causes of unbalance.

One of the principal causes is high resistance contacts in the twisted sleeve joints of line wires. It has been found that direct current measurements, which it has been customary heretofore to make, fail in many cases to accurately determine the magnitude or position of these joints. This inherent defect in direct current measurements probably results from the tendency of the current which flows during the period in which the measurement is being made, to change the magnitude of the sleeve resistance thereby giving rise to a false measurement, which is generally lower than the actual resistance of the joint to signaling currents. It has been found that the resistance which has been lowered by the process of measurement returns to its original value after the source of direct current has been disconnected.

One of the objects of this invention is to provide a testing system having as its source of energy an alternating current generating device, capable of producing current of approximately the same frequency as the voice currents transmitted over telephone signaling circuits whereby the magnitude of the resistance or other unbalance in the circuit, as measured, will be approximately that which opposes the propagation of the voice currents.

Another object of this device is to provide an arrangement whereby the source of alternating energy, which is connected to one end of the circuit under test, may be controlled at a remote point upon the circuit where the receiving device is connected with the circuit. This not only enables one man to operate the test set, but also limits the period of application to the circuit of the testing potential, since the test man can listen in upon the circuit and can control from the listening point the application of the testing potential to the circuit under test.

Other and further objects of this invention will appear from the following description, when read in connection with the attached drawing which shows one form of embodiment of the invention.

In the drawing, 1, 2, 3 and 4 represent four conductors constituting the lines $L_1$ and $L_2$ which, for example, may be any two pairs of signaling circuits, and, when properly connected constitute a phantom telephone circuit. R represents a resistance in conductor 1, which may be of any magnitude. Such resistance may be created by an imperfectly twisted joint in a line wire, which causes a resistance unbalance between the sides of the circuit. The approximate location of such resistance unbalance having been previously made from some central testing point, it is the object of the applicant's invention to make a precise location of the defect. This has usually been made by connecting the source of testing potential, comprising the apparatus within the dotted lines X, with one end of the circuit under test and connecting the other part of the testing apparatus comprising the devices within the dotted line Y, with the other end of the circuit under test, so that the fault will lie between the two points of connection.

The source of testing potential comprises the balanced retardation coils 5 and 6 which are adapted to be connected with the conductors of the line circuit by means of leads 40, 41, 42 and 43 equipped with clips for fastening the leads to the conductors of the line circuit. Connected in series between the mid-points of the coils 5 and 6 are the batteries $B_1$ and $B_2$ and the winding of relay 7. Controlled by relay 7 is relay 8, which when energized sets in operation the source of testing potential 9, and also short-circuits the line circuits $L_1$ and $L_2$ with which the leads from the source of testing potential may be connected. This short-circuiting of the line circuits prevents unbalances in the line to the left of point A from causing a tone in the receiver at B, but the short-circuiting of the coils 5 and 6 does not prevent the proper functioning of the coils with respect to the oscillator current.

The source of alternating potential here shown is a type of harmonic vibrator. It comprises a carbon transmitter 10, the button of which is under the control and influence of a vibrating reed which in turn is controlled by the magnets 11. The condenser 12 is connected in parallel with the inductance 11 and another condenser 13 is connected in one of the conductors of the output circuit of the vibrator.

The apparatus within the dotted lines Y constitutes what may be termed the receiving circuit. $T_1$ and $T_2$ represent two repeating coils having primary windings 15 and 17 respectively and secondary windings 16 and 18 respectively, each primary winding being divided in two halves. Connected between the two halves of each primary winding is a coil of a potentiometer, and the moving arm of each potentiometer is connected with the switch 21. The secondary coils 16 and 18 are connected with the upper and lower contacts respectively of the switch 22, and the moving contacts or blades of the said switch are in turn connected with the receiver 23, and also with the contacts of switch 21. The primary windings of the coils $T_1$ and $T_2$ are connected through the switches 19 and 20 respectively with leads 40′, 41′, 42′ and 43′ having clips connected thereto in order that connections may readily be made with the conductors of the lines $L_1$ and $L_2$. Associated with switch 21 is another switch 24, whose function is to control directly the operation of relay 7 which in turn controls the application of the testing potential to the circuit under test.

Having in mind the foregoing description of the apparatus, this invention will be better understood from the following description of its mode of operation. Let it be assumed that the source of testing potential is connected with the conductors of the circuits $L_1$ and $L_2$ at some junction point of the line such as a cable terminal, a loading point, the end of a transposition section, or one end of any section of line in which it is believed that unbalance exists. The receiving apparatus is connected to the other end of the section of the same line with which the source of testing potential is connected, the apparatus being connected by fastening the test clips to the respective conductors. Since the coils 5 and 6 and the windings 15 and 17 of the coils $T_1$ and $T_2$ are well balanced, it will be seen that no unbalance is created by bridging these coils or windings across the line circuits and consequently this may be done upon working circuits without causing circuit interruptions. By means of the receiver 23, the test man may listen upon each of the side circuits and upon the phantom circuit in order to determine whether these circuits are being used for the transmission of signals. This is done by the proper manipulation of the switches 19, 20, 21 and 22. Thus, when switch 19 is closed and switch 22 is in its upper position, the receiver is connected to the side circuit $L_1$. In a corresponding way, when switch 20 is closed, and 22 in its lower position, the receiver is connected with the side circuit $L_2$; and, furthermore, with switches 19, 20 and 21 closed, the receiver is bridged across the phantom circuit of the side circuits $L_1$ and $L_2$.

If the test man finds the circuits idle, he will operate the key 24 which establishes a circuit from the upper contact of switch 24, midpoint of winding 15, over conductors 1 and 2, in parallel, through the windings of coil 5, batteries $B_1$ and $B_2$, relay 7 windings of coil 6 and conductors 3 and 4 in parallel to the midpoint of windings 17 and thence to the contact of key 24. This results in the operation of relay 7, which, in turn, causes current to flow from battery $B_2$ through a circuit embracing the winding of relay 8 and contact of relay 7. Through the closing of the contacts 25 and 26, a circuit is established from one side of battery $B_1$ contact 25, the variable resistance carbon transmitter 10, winding 11, contact 26, to the other side of battery $B_1$. This sets in operation the harmonic vibrator 9, which by the action of its reed causes the variance of resistance of the transmitter 10. The resulting oscillations are impressed on the circuits $L_1$ and $L_2$ over the conductors connected with the midpoints of coils 5 and 6. The closing of contacts 27 and 28 short circuits lines $L_1$ and $L_2$ and as stated protects the receiver against the effects of unbalances in the lines to the left of point A. The currents flowing through the conductors 1, 2, 3 and 4, will be divided in accordance with the resistances of the conductors and will subsequently flow through the windings 15 and 17 of the coils $T_1$ and $T_2$. If a perfect balance existed on the side circuit, i. e. if no unbalance, such as for example R, existed in any conductor, no sound would be heard in the receiver when the resistance of each of the potentiometers 29 and 30 is equally divided between the two wires of each side circuit. If an unbalance exists in one wire of the side circuit, due to the presence of an improperly twisted joint or other source of irregularity, such as R, a balanced condition can only be obtained by adjusting the variable resistance of the potentiometer connected with that circuit until no tone is perceptible in the receiver 23, and the amount of change of the potentiometer will indicate the magnitude of the unbalance.

If a balance cannot be obtained, regardless of the extent of adjustment of the potentiometer, it should be adjusted for minimum tone. Experience in testing signaling circuits shows that when a minimum tone is obtained with an equal division of resistance between the two wires the unbalance is due entirely to capacity or inductance; and furthermore if the minimum tone is obtained with an unequal division of resistance, the faults include both resistance and capacity, or resistance and inductance unbalance. To locate the position of a fault, the receiving circuit should be connected with the line circuits at a point nearer the source of potential and another test made similar to that aforedescribed. In this manner the actual location of the trouble may be determined.

The foregoing description makes clear the method of testing for unbalances of the side circuits of a phantom group. My invention is not thus limited but is capable of measuring the unbalances existing in a phantom circuit and also in a non-phantomed circuit. Thus, in order to measure the unbalance existing in a phantom circuit represented for example by the group of side circuits $L_1$ and $L_2$, the conductors 1 and 2 should be short-circuited at both points A and B, and in like manner conductors 3 and 4 should be similarly short-circuited. The connecting lead 40 should be connected with the short-circuited conductors 1 and 2 at A, and lead 41 should in a similar manner be connected with the short-circuited conductors 3 and 4. Leads 42 and 43 should be grounded. At the point B lead 40' should be connected with the short-circuited conductors 1 and 2, and in like manner lead 41' should be connected with the short-circuited conductors 3 and 4. Leads 42' and 43' should be grounded at point B. It will be seen that current will flow from the oscillator 9 through the windings of coil 5 over the conductors 1—2 and 3—4 in parallel to the point B, thence through the leads 40' and 41' and windings of coil 15 and of potentiometer 29, receiver 23 and thence over a grounded return to the oscillator 9. The switch 22 should be closed in its upper position and switch 24 should be operated so as to apply current from source 9 to the line. By moving the arm of potentiometer 29 until no tone is perceptible in the receiver 23, the magnitude of the unbalance existing in the phantom circuit may be determined.

In similar manner the magnitude of any unbalance existing in a non-phantomed circuit such as $L_1$ may be determined. In order to do so, leads 40 and 41 should be connected with conductors 1 and 2 at the point A as shown in the drawing, and leads 40' and 41' should be connected with the same conductors at point B as shown in the drawing. Leads 42 and 43 should be grounded at point A and leads 42' and 43' should be grounded at point B. Current from the source 9 will then flow through the halves of coil 5 and over the conductors 1 and 2 in parallel, and thence through the halves of winding 15 and potentiometer coil 29 to the receiver 23, and from thence back to the source 9 through a grounded connection. By adjusting the potentiometer 29 until no tone is perceptible in the receiver the magnitude of the unbalance may be determined. In this test, as in the preceding one, the switch 22 should be closed in its upper position and switch 24 should likewise be operated.

It will be seen from the foregoing that the invention comprises portable means for accurately and efficiently determining the location of an unbalance in a circuit, which may be due to resistance, inductance or capacity. It also provides means whereby the source of testing potential is remotely controlled by the test man at the point where his receiving circuit is connected with the circuit under test, so that such testing potential will be applied to the line only for the minimum time required to make the test and only at those times when the circuits are idle, which is determined by the test man listening in at the point where his receiving device is located.

Although this invention has been described as having a certain form of embodiment, it is apparent that it is capable of embodiment in other and different forms without departing from the spirit and scope of the appended claims:

What is claimed is:

1. In an electrical testing system for locating irregularities in a line circuit, the combination of a line circuit, a source of varying potential, means for connecting said source with the said line circuit, a measuring circuit having means for connecting it with the said line circuit at a point remote from that at which the said source of potential is connected thereto and having associated therewith means for determining the nature and the magnitude of an irregularity existing in the said line circuit, and means associated with the said measuring circuit to control the application of the potential to the said line circuit.

2. In an electrical testing system for locating irregularities in a line circuit, the combination with a phantom line circuit of a source of alternating potential having means for connecting the said source with the said line circuit, a measuring circuit also having means for connecting it with the said line circuit at a point remote from that at which the said source is connected, and having associated therewith means for controlling the application of the said potential to the said line circuit, and means for determining the nature and the magnitude of the irregularities existing in the said line circuit.

3. In an electrical testing system, the combination with a line circuit characterized by an electrical unbalance, a source of alternating potential, means to bridge the same source across the said line circuit, an unbalance measuring device having means to bridge it across the said line circuit at a point remote from the point of connection of the said source with the said line circuit, and means associated with the said measuring device to control the connection of the said source of potential to the said line circuit.

4. In an electrical testing system, the combination of a line circuit characterized by electrical unbalance, a source of testing potential having means to bridge it across the said line circuit, an unbalance measuring device having means to bridge it across the said line circuit, and means associated with the said measuring device to set in operation and effectively connect the said source of testing potential to the line circuit.

5. In an electrical testing system, the combination of two pairs of line wires, balanced retardation coils, means to bridge said coils across the said pairs, switching means to connect a source of testing potential with the midpoint of each of said coils, and means associated with the said switching means to shunt the said retardation coils when the said source of potential is connected thereto.

6. In an electrical testing system, the combination of a source of alternating current, a transmission line characterized by unbalance between conductors, balanced retardation coils, means to bridge the said coils across each pair of said conductors, switching means to effect the connection of the said alternating current source to the midpoints of the said retardation coils, a second group of coils, means to connect said second group of coils across the said pairs of conductors at a point remote from the point of connection to the said first retardation coils and having a potentiometer associated with each of said second coils, a current indicating device and switching means associated therewith adapted to control the operation of the said first mentioned switching means whereby the application of the alternating current may be controlled from a point of the line remote from the source of alternating current.

In testimony whereof, I have signed my name to this specification this fifth day of May 1921.

BENJAMIN H. BIRCHALL.